3,202,610
LUBRICANTS CONTAINING POLYMERIC
EXTREME PRESSURE AGENTS
Herbert C. Evans, Halton, and Peter Kirby, Kelsall, England, assignors to Shell Oil Company, New York, N.Y., a corporation of Delaware
No Drawing. Filed July 31, 1962, Ser. No. 213,621
Claims priority, application Great Britain, Feb. 28, 1962, 7,896/62
8 Claims. (Cl. 252—58)

The invention relates to improved lubricating oil compositions containing an oil-soluble non-ash forming polymeric compound possessing extreme pressure and antiwear properties and to an improved method of preparing said polymeric additive.

It is known that allyl halides can be polymerized in the presence of different types of catalysts such as organic peroxides, Friedel-Craft or boron trifluoride catalysts and at very low temperatures which may be as low as $-80°$ C., to produce essentially oil-soluble resinous products of high molecular weight.

It has now been discovered that an excellent oil-soluble non-ash forming polymer possessing extreme pressure and wear inhibiting properties can be prepared by polymerizing a $C_{1-6}$ hydrocarbyl (alkyl or aryl) substituted allyl halide and its homologues in the presence of a neutral solvent such as a liquid hydrocarbon, e.g. hexane, isooctane etc. and a Ziegler catalyst made up of two components (A) and (B) as defined below and at temperatures which may be as high as $75°$ C., preferably between about $10°$ C. and about $50°$ C. and the reaction time may vary from 2 to 48 hours, preferably from 5 to 24 hours. These halogen-containing polymers may range in molecular weight from about 300 to about 1,000, preferably from about 320 and 450.

The hydrocarbyl substituted allyl halide used as the starting monomer to form the end polymers of the present invention can be illustrated by methallyl chloride, 2-ethyl-3-chloropropene, 2-propyl-3-chloropropene, 2-butyl-3-chloropropene, 2-phenyl-3-chloropropene, methallyl bromide, 2-ethyl-3-bromopropene, 2-phenyl-3-bromopropene and mixtures thereof.

Component (A) of the catalyst is defined as a compound, (preferably other than a heat-treated oxide, a carbide, or naturally-occurring compound), of a metal of Groups 4a, 5a, 6a or 7a of the Periodic Classification of Elements or a compound of iron, e.g., ferric chloride, although the compound is more suitably an inorganic compound for example a halide, or oxyhalide of a metal of Groups 4a, 5a, 6a or 7a of the Periodic Classification of Elements or a compound of iron, e.g., ferric chloride, although the compound is more suitably an inorganic compound for example a halide, or oxyhalide of a metal of Groups 4a or 5a. It is preferred, however, that Component (A) should comprise a chloride, bromide, iodide or oxychloride of a Group 4a or 5a metal particularly titanium, tin or lead, e.g., tin tetrachloride or lead tetrachloride. The most preferred compound is titanium tetrachloride, although the chlorides or oxychlorides of, for example, zirconium and vanadium, e.g., vanadium oxychloride can be used, but usually resulting in reduced yields. The compounds which are used as Component (A) are ones which are liquid at normal temperatures and pressures, and ones in which the metal present in the compound is in its highest valency state.

Component (B) is defined as one of the following:
(1) A Group 1, 2 or 3 metal or an alloy thereof, or as
(2) An organo-metallic compound or a hybrid of a Group 1, 2 or 3 metal, tin or lead.

The term "organo-metallic compound" means a compound (other than an inorganic metal carbide) in which the metal is directly attached to the organo radical through a carbon atom. Preferably the metal is attached to a hydrocarbyl radical, for example as in compounds such as zinc dimethyl or magnesium dipropyl. Alkyl radicals are the particularly preferred radicals.

The more suitable compounds for use as Component (B) and the ones which in general result in reasonable yields of polymer are the organo-metallic compounds of a Group 2 or 3 metal, for example zinc diethyl or gallium triethyl. It is preferable, however, that Component (B) should comprise one of the following:
(1) An aluminium trialkyl; or
(2) An aluminium compound of the general formula $R_1R_2AlX$ in which $R_1$ and $R_2$ are similar or dissimilar and each represents a hydrogen atom or an alkyl, alkaryl, aryl, aralkyl, alkenyl, alkynyl, cycloalkyl or cycloalkenyl radical and X represents a hydrogen atom, a halogen atom, an alkoxy group or an aryloxy group; or
(3) An aluminium compound of the general formula $RAlX_1X_2$ in which R represents a hydrogen atom or a hydrocarbon radical as in (2) above, and $X_1$ and $X_2$ are similar or dissimilar and each represents a halogen atom other than fluorine, or an alkoxy group or an aryloxy group.

Examples of suitable aluminium compounds are: aluminium triethyl, aluminium triisobutyl, diethyl aluminium chloride, or bromide, diisobutyl aluminium hydride, ethyl aluminium dichloride and ethyl aluminium sesqui-chloride. The aluminium sesqui-halides can be considered as equimolecular mixtures of the dialkyl aluminium halide and the alkyl aluminium dihalide.

When using as Component (B) any of the hereinbefore defined classes of compounds and any Component (A), the mole ratio Component (B) to Component (A) must be less than 1:1 and at least 0.05:1; in the case where Component (B) is defined by the formula $RAlX_1X_2$, the molar ratio of (B) to (A) can be in excess of 1:1.

The process of the present invention is illustrated by the following specific examples.

EXAMPLE I

A solution of methallyl chloride (60 gms., 0.663 mole) in 100 mls. isooctane was placed in a 500 mls. flask. The flask was flushed out with nitrogen. $TiCl_4$ (1.6 mls.), was injected into the stirred solution using a hypodermic syringe. The solution turned dark brown. On adding a solution of 6 mls. of 10% $AlEt_3$ in isooctane, the temperature rose from $20°$ C. to $50°$ C. The dark brown suspension of catalyst soon coagulated and was sticky in appearance. The mixture was then stirred for 24 hours at room temperature. The catalyst component mole ratio (B:A was 0.3:1).

The catalyst was decomposed by addition of 100 mls. of isopropyl alcohol. The solution became clear green. The solution was washed with water, dilute hydrochloric acid, dilute sodium bicarbonate solution and finally with water. The organic layer was dried and stripped to a base temperature of $130°$ C. and 15 mm. The residue, a dark brown viscous polymer, weighed 18.1 gr. (30.1% yield).

*Analysis*

Bromine No. addition _____ −55
Chlorine content _____ percent w./w___ 34.4

EXAMPLE II

A solution of metallyl chloride 4 mole in 600 ml. isooctane) was placed in a 2 litre flask which was flushed out with nitrogen. $TiCl_4$ (9.6 mls.) was injected into the stirred solution, which was then cooled to $10°$ C. A solution of 8.5% aluminum triethyl in isooctane (40 ml.)

was then added, and the temperature rose to 21° C. After stirring for 1 hour a further 15 ml. of AlEt₃ was added, giving a final molar ratio (B:A) of 0.4:1. The temperature rose by a further 4°, and the solution was stirred for 5 hours.

Chloroform was added to dissolve the precipitate which had formed, and the catalyst was decomposed by adding 300 mls. of isopropyl alcohol. The solution was washed with water, dilute hydrochloric acid, dilute sodium bicarbonate solution, and finally with water. The organic layer was dried and stripped to a base temperature of 140° C. at 0.3 mm. pressure. The residue, a dark brown viscous polymer, weighed 91 g. Its properties were:

Molecular weight (ebullisocopic) _____ 388
Viscosity:
    100° F. _____cs__ 292
    210° F. _____cs__ 12.6
Bromine number _____ 17
Chlorine content _____percent w./w__ 34

EXAMPLE III

The same procedure was carried out as in Example I, using 4 moles of methallyl chloride in 600 mls. of isooctane. 8 ml. of titanium tetra-chloride was added, followed by 55 mls. of a 10% solution of aluminium tri-ethyl, giving a catalyst component mole ratio (B:A) of 0.55:1. The yield of polymer was 112 g. (31%) and its properties were:

Molecular weight (ebullioscopic) _____ 340
Viscosity:
    100° F. _____cs__ 203
    210° F. _____cs__ 10.6
Bromine number _____ 10
Chlorine _____percent w./w__ 37.7

The above type polymers are miscible in mineral lubricating oils in all proportions and with synthetic ester lubricants and when dissolved in lubricating oils in such quantities that it forms from 2%–5% of the resulting composition, provides a composition which has improved lead bearing properties compared with the lubricating oil alone.

In addition to the above-described lubricating oil compositions such composition can be modified with small amounts of other additives (0.01–2%) such as pour point depressants, viscosity index improvers, blooming agents, corrosion inhibitors, oiliness agents, solubilizer, and the like. Among such materials are high-molecular-weight polymer, e.g., "Acryloids," which are polymeric esters of methacrylic acid and long-chain fatty alcohols, e.g., mixtures of wax-naphthalene condensation products, isobutylene polymers, alkyl styrene polymers; organic nitrites diisopropylammonium nitrite and dicylcohexylammonium nitrite; organic phosphites, phosphates and phosphonates such as trichloroethyl phosphate, tricresyl phosphate, dilorolphosphate, phosphorus sulfide-olefinic reaction products such as $P_2S_5$-terpene reaction products, organic sulfides, e.g., wax disulfide, ethylene bistolyl sulfide sulfurized olefins and fatty acid e.g. sulfurized $C_{8-30}$ olefins or sulfurized oleic acid; amines, e.g., octadecylamine and the like. Also, phenolic antioxidants such as alklated mono and diphenols e.g. 2,6-ditertiary-4-methyl phenol, 2,6 - ditertiary - 4 - methylol phenol, and 2,2' - methylene bis(4 methyl-6-tertiarybutyl-phenol) etc., can be used in conjunction with the polymers of this invention.

To illustrate the lubricating compositions of this invention, the following blends were made and tested:

COMPOSITION X

|  | Parts |
|---|---|
| Solvent refined mineral oil viscosity 160 sec. (Red I, 140) | 75 |
| Solvent refined mineral oil viscosity 65 sec. (Red I, 140) | 20 |
| Polymer of Example I | 5 |
| 2.6 di-t-butyl-4-methyl phenol | 0.4 |
| Reaction product of maleic anhydride and cracked was $C_{5-30}$ olefins | 0.02 |
| Sulfurized oleic acid | 0.06 |

This composition has a KVI of 103 and a viscosity at 210° F. of 10 cs. It is suitable as a steam turbine oil. Tested by the Steam Demulsification Test (I.P. 19–55) this oil gave a demulsification number of 210 sec. compared with 215 sec. for a composition in which the additive of the invention was replaced by an equal weight of a chlorinated paraffin wax containing 42% wt. chlorine, sold under the trademark "Gereclor." Under the ASTM Test D943–54 "Oxidation Characteristics of Inhibited Steam Turbine Oils," composition A passed the test with a life exceeding 1000 hours.

COMPOSITION Y

|  | Parts |
|---|---|
| Solvent refined oil of viscosity 65 sec. (Red I, 140°) | 96.7 |
| Polymer of Example I | 3.3 |

This composition was tested in the 4-ball machine in which known loads were applied for 1 minute with the lubricant at room temperature. For comparative purposes the base oil was also tested under the same conditions. Results were:

|  | Load, kg. | Wear scar, mm. |
|---|---|---|
| Base oil | 100 | 25.5 |
| Do | 120 | weld |
| Composition X | 100 | 1.64 |
| Do | 200 | 2.36 | showing that this composition has good load-carrying capacity.

COMPOSITION Z

|  | Parts |
|---|---|
| Solvent refined oil viscosity 65 sec. (Red I: 140°) | 97 |
| Polymer of Example II | 3 |

This composition was KVI of 95. It was tested in an L.A.E. 3¼-inch gear lubricant testing machine as described by Mansion (J.I.P. 1952, 38 633) using B.S.S. EN34 steel gears. In this test weights are applied to obtain a torsional stress in the drive shafts and thus lead the gears. The load is progressively increased until scuffing occurs. Results are:

|  | 2,000 r.p.m., 60° C. | 6,000 r.p.m., 110° C. |
|---|---|---|
| Base oil, lb | 55 | 20 |
| Composition Z, lb | 125 | 50 |

Lubricating compositions of this invention are applicable for wide temperature and extreme pressure use as encountered in various engines and industrial equipment.

We claim as our invention:

1. A lubricating oil composition consisting essentially of a major amount of lubricating oil and from about 2% to about 5% of an oil-soluble polymer of a $C_{1-6}$ hydrocarbyl substituted allyl halid compound the hydrocarbyl radical being in the 2-position and selected from the group consisting of alkyl and aryl groups, said polymer being prepared by polymerizing said allyl halide compound in the presence of a neutral solvent and catalyst consisting essentially of aluminum alkyl and titanium halide, the mole ratio being between 0.05:1 and 1:1 respectively, said polymer having a molecular weight of from about 300 to about 1000.

2. A lubricating oil composition consisting essentially of a major amount of lubricating oil and from about 2% to about 5% of an oil-soluble polymer of a 2-$C_{1-6}$ alkyl substituted allyl chloride compound prepared by polymerizing said allyl halide compound in the presence of a neutral solvent and with a catalyst consisting essentially of aluminum alkyl and titanium halide, the mole ratio being between 0.05:1 and 1:1 respectively, said polymer having a molecular weight of from about 300 to about 1000.

3. A mineral lubricating oil composition consisting essentially of a major amount of mineral lubricating oil and from about 2% to about 5% of oil-soluble methallyl chloride polymer having a molecular weight of from about 320 to about 450 prepared by polymerizing methallyl chloride in the presence of isooctane and a catalyst consisting essentially of aluminum trialkyl and titanium chloride in the mol ratio of 0.05:1 respectively and at a temperature of from about 10° C. to about 50° C. for from 5 to 24 hours.

4. A mineral lubricating oil composition consisting essentially of a major amount of mineral lubricating oil and from about 2% to about 5% of oil-soluble methallyl chloride polymer have a molecular weight of from about 320 to about 450 prepared by polymerizing methallyl chloride in the presence of isooctane and a catalylst consisting essentially of aluminum triethyl and titanium tetrachloride in the mole ratio of 0.05:1 respectively and at a temperature of from about 10° C. to about 50° C. for from 5 to 24 hours.

5. The process for preparing an oil-soluble polymer of a $C_{1-6}$ hydrocarbyl substituted allyl halide compound the hydrocarbyl radical being in the 2-position and selected from the group consisting of alkyl and aryl groups, said polymer being prepared by polymerizing said allyl halide compound in the presence of a neutral solvent and catalyst consisting essentially of aluminum alkyl and titanium halide, the mole ratio being between 0.05:1 and 1:1 respectively, said polymer having a molecular weight of from about 300 to about 1000, the resulting polymer being useful as an oil additive.

6. The process for preparing an oil-soluble polymer comprising reacting a 2-$C_{1-6}$ alkyl substituted allyl chloride compound prepared by polymerizing said allyl halide compound in the presence of a neutral solvent and catalyst consisting essentially of aluminum alkyl and titanium halide, the mole ratio being between 0.05:1 and 1:1, said polymer having a molecular weight of from about 300 to about 1000, the resulting polymer being useful as an oil additive.

7. The process for preparing an oil-soluble methallyl chloride polymer comprising reacting methallyl chloride of aluminum trialkyl and titanium chloride in the mol ratio of 0.05:1 respectively and at a temperature of from about 10° C. to about 50° C. for from 5 to 24 hours, the resulting polymer being useful as an oil additive.

8. The process for preparing an oil-soluble methallyl chloride polymer comprising reacting methallyl chloride of aluminum triethyl and titanium tetrachloride in the mol ratio of 0.05:1 respectively and at a temperature of from about 10° C. to about 50° C. for from 5 to 24 hours, the resulting polymer being useful as an oil additive.

References Cited by the Examiner

UNITED STATES PATENTS

| | | | |
|---|---|---|---|
| 2,263,654 | 11/41 | Sparks | 260—91.7 |
| 2,335,608 | 11/43 | Pings | 252—58 |
| 2,336,648 | 12/43 | Sparks | 260—81.7 X |
| 2,533,425 | 12/50 | Carnell | 260—91.7 X |
| 2,553,982 | 5/51 | Sarge | 260—91.7 |
| 2,695,880 | 11/54 | Benning et al. | 252—58 |
| 2,716,641 | 8/55 | Van der Plas et al. | 260—91.7 |
| 2,926,140 | 2/60 | De Vault | 252—58 |
| 3,081,294 | 3/63 | Beynon | 252—58 X |

DANIEL E. WYMAN, *Primary Examiner.*

JULIUS GREENWALD, *Examiner.*